United States Patent [19]
Renna

[11] Patent Number: 5,772,022
[45] Date of Patent: Jun. 30, 1998

[54] COMPACT DISC STORAGE CASE

[76] Inventor: Douglas J. Renna, 131 Munro Blvd., Valley Stream, N.Y. 11581

[21] Appl. No.: 857,975

[22] Filed: May 16, 1997

[51] Int. Cl.⁶ .................................................. B65D 85/57
[52] U.S. Cl. ...................................... 206/312; 206/308.1
[58] Field of Search ................................ 206/308.1, 310, 206/312, 313

[56] References Cited

U.S. PATENT DOCUMENTS

| | | | |
|---|---|---|---|
| 3,112,858 | 12/1963 | Ullger | 206/313 |
| 5,289,918 | 3/1994 | Dobias et al. | |
| 5,419,433 | 5/1995 | Harrer et al. | |
| 5,421,453 | 6/1995 | Harrer et al. | |
| 5,427,236 | 6/1995 | Kramer | 206/310 |
| 5,647,482 | 7/1997 | Kleinfelder | 206/312 |

FOREIGN PATENT DOCUMENTS 1316922  6/1987  U.S.S.R. ............................ 206/308.1

*Primary Examiner*—David T. Fidei
*Attorney, Agent, or Firm*—Collard & Roe, P.C.

[57] ABSTRACT

A disc storage case formed from a single sheet, comprising a center panel having an inside surface and an outside surface and two disc support sections, with each disc support section being integrally formed with an opposite edge of the center panel. Each disc support section forms a side wall, a top sloped wall and a bottom flap. The side wall is connected to the center panel by a first scored hinge and to the top sloped wall by a second scored hinge. The top sloped wall is connected to the bottom flap by a third scored hinge. The top sloped wall has an arcuately-shaped slit cut therethrough. Each end of the slit terminates at the third scored hinge, such that upon folding the disc support sections along the hinges, the slit creates an arcuate opening for insertion of a disc. The case is assembled by folding each side wall up from the center panel and each top slanted wall toward the center of the inside surface of the center panel, and folding each of the bottom flaps under the top slanted walls to rest against the inside surface of the center panel.

6 Claims, 4 Drawing Sheets

COMPACT DISC STORAGE CASE

FIELD OF THE INVENTION

This invention relates to a compact disc storage case. In particular, this invention relates to a compact disc storage case that is made from a single scored and folded sheet.

THE PRIOR ART

Sales and distribution of compact discs has grown considerably over the last decade, and along with this growth have been many attempts to construct storage cases for such discs. Along with compact discs, the growth of CD ROM computer technology and video disc technology has increased the demand for suitable storage cases.

The traditional case is the plastic "jewel-box". This type of CD case is constructed of two clear plastic pieces that are hinged together. The plastic used is typically injection-molded polystyrene, which is a rigid, brittle plastic. In the center of the pieces are elements that serve to mount the CD within the case and to prevent any part of the case from contacting the surface of the CD.

While this jewel-box type of CD case serves to protect the CD from contact with dirt and impact, it can be easily broken if dropped, thus risking damage to the CD. In addition, the plastic cases increase the weight of the CD package and increase shipping costs, which can become very expensive in the mass production and distribution of compact discs, such as for promotions by computer on-line service companies, or by mail-order music companies.

Finally, the mass production of plastic jewel-box CD cases has raised many environmental concerns, especially since polystyrene is not recyclable and its manufacture is potentially environmentally hazardous.

Thus, there has been an effort in the industry to construct a CD storage case that minimizes the use of brittle polystyrene in place of more environmentally safe products. One solution to the jewel box has been to mount a plastic support having a hub for attaching the CD within a cardboard jacket. Examples of such products are shown in U.S. Pat. Nos. 5,419,433 and 5,421,453, both to Harrer et al. While these patents are an improvement over the traditional "jewel-box" type case, they still require the use of several components to construct, and still require the use of a plastic insert to mount the CD.

Paper or cardboard cases for compact discs have been produced, in which the CD is inserted into a cardboard pocket in the case. While this solves the problem of using a plastic hub, the CD can become easily scratched or damaged from contact with the case itself. In addition, the CDs must be placed into the case by hand, which is not feasible with mass production and distribution of CDs.

One effort to overcome this disadvantage is shown in U.S. Pat. No. 5,289,918 to Dobias et al., which shows a CD case constructed of a single pre-scored sheet of paperboard, which is then folded and glued into shape. The CD is mounted on a disc holder panel, which contacts the CD at four points along its outer edge and holds the CD in place.

While this device is environmentally safe and lightweight for shipping, it too suffers from many drawbacks. First, the flaps that form the disc holder panel must be glued down onto the disc holder panel for the case to maintain its shape. This process is impossible if one wishes to produce a large volume of the cases, because all of the gluing must be done by hand. Second, the disc holder panel is formed from elliptical cutouts in which the CD is inserted. These cutouts are difficult to make, and slow down the manufacturing process if a large volume of the discs is being produced. Third, once the case is cut, assembled and glued, it cannot be flattened out again to facilitate shipping of the cases to disc manufacturers. Fourth, the insertion and removal of a compact disc is difficult because the disc support panels are glued in place and are therefore not easily moved to accommodate the disc.

SUMMARY OF THE INVENTION

It is therefore an object of the present invention to provide a compact disc storage case that can be manufactured from a single sheet of paperboard, cardboard, or other environmentally safe material.

It is another object of the present invention to provide a compact disc storage case that can be assembled without the use of glue or other adhesives.

It is yet another object of the present invention to provide a compact disc storage case that can be shipped in a flattened state and easily reassembled at its destination for storage of a compact disc.

It is a further object of the present invention to provide a compact disc storage case in which discs can easily be inserted by automated methods.

It is still a further object of the present invention to provide a compact disc storage case that is simple and economical to manufacture in large quantities.

These and other objects of the present invention are accomplished by a disc storage case formed from a single sheet, comprising a center panel having an inside surface and an outside surface and two disc support sections, with each disc support section being integrally formed with an opposite edge of the center panel. Each disc support section forms a side wall, a top sloped wall and a bottom flap. The side wall is connected to the center panel by a first scored hinge and to the top sloped wall by a second scored hinge. The top sloped wall is connected to the bottom flap by a third scored hinge.

The top sloped wall has an arcuately-shaped slit cut therethrough. Each end of the slit terminates at the third scored hinge, such that upon folding the disc support sections along the hinges, the slit creates an arcuate opening for insertion of a disc. The spaces between the slits is preferably slightly less than the diameter of the disc, so that the disc is firmly held in place at its edges by the slits. When the disc support section is folded along the hinges, an arcuate flap corresponding to the slit is created along the level of the bottom flap, and extends toward the center of the case. This flap prevents the disc from contacting the bottom of the case, so that only very small areas of the disc contacting the bottom of the case, so that only very small areas of the disc contact the case.

The case is assembled by folding each side wall up from the center panel and each top slanted wall toward the center of the inside surface of the center panel, and folding each of the bottom flaps under the top slanted walls, to rest against the inside surface of the center panel.

There is at least one cover panel hingedly connected to the center panel, which is adapted to be folded over the center panel to protect the disc. A second cover panel can connect to the first cover panel, so that both cover panels are folded around the center panel to further protect the disc mounted inside.

The case is preferably made from a single sheet of scored paperboard. The case can be pre-printed on all available surfaces, to display advertising or illustrative material. The case can be manufactured by any commercially used die cutting machines, that can both cut the paper board and score the hinges. Preferably, the inside surface of the disc is made of a smooth or laminated paper, to prevent any scratching of the disc surface or deposit fibers from inadvertent contact with the case.

The case can be shipped prior to any folding, and then folded at its destination, or can be folded and then flattened for shipping. In the folded state, the side walls of the support sections can be pressed inward toward the center of the center panel, to flatten the side wall and top sloped wall down, which facilitates stacking of the cases for shipping. After the case arrives at its destination and is removed from the stack, the side walls and top sloped wall can be very easily pressed back into position and are ready to receive a disc.

The arcuate slits in the case readily accommodate a disc and support it along its outside edges, so that most of the disc surface is not contacted by the case. The flexible nature of the side and top walls of the disc support sections allows discs to be easily inserted by automated machines. Discs can be inserted and removed merely by pulling one or both of the side walls away from the center panel, which widens the space into which a disc is inserted or removed. In addition, pulling the side walls away from the center causes the arcuate flaps to push the disc up and out of the case, so that the disc can be removed with minimal handling.

In the assembled case, there is room underneath the inserted disc to insert a booklet related to the disc, for example, lyrics or instructions. The booklet can be slid in between the center panel and the bottom flaps, and is held in place by the downward pressure of the bottom flaps. This placement of the booklet ensures that the disc itself does not contact the booklet, which can mar the surface of the disc.

The case is preferably constructed so that it is the same dimensions as the traditional CD jewel box. This way, the case can be easily stored and displayed in stores and homes along with CDs that have been purchased in other stores. This is especially important if the discs are intended to be stored in a CD "tower" or other type of display system, in which the storage slots are of the exact dimensions of a CD jewel box.

If desired, the disc case can be formed to accommodate two or more discs, merely by forming the sheet with multiple center panels and support sections that are all hingedly connected together. Multiple cover panels could be provided to fold over each center panel and protect the discs.

The disc storage case according to the invention can be used to store numerous types of recording media, such as musical compact discs, CD ROMs, digital video discs, and even vinyl phonograph records. The only adjustment in the case for each type of recording medium is the size of the case.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 5 is an end view of the disc storage case according to the invention as it is compressed for shipping;

DETAILED DESCRIPTION OF THE PREFERRED EMBODIMENTS

Figure 1:
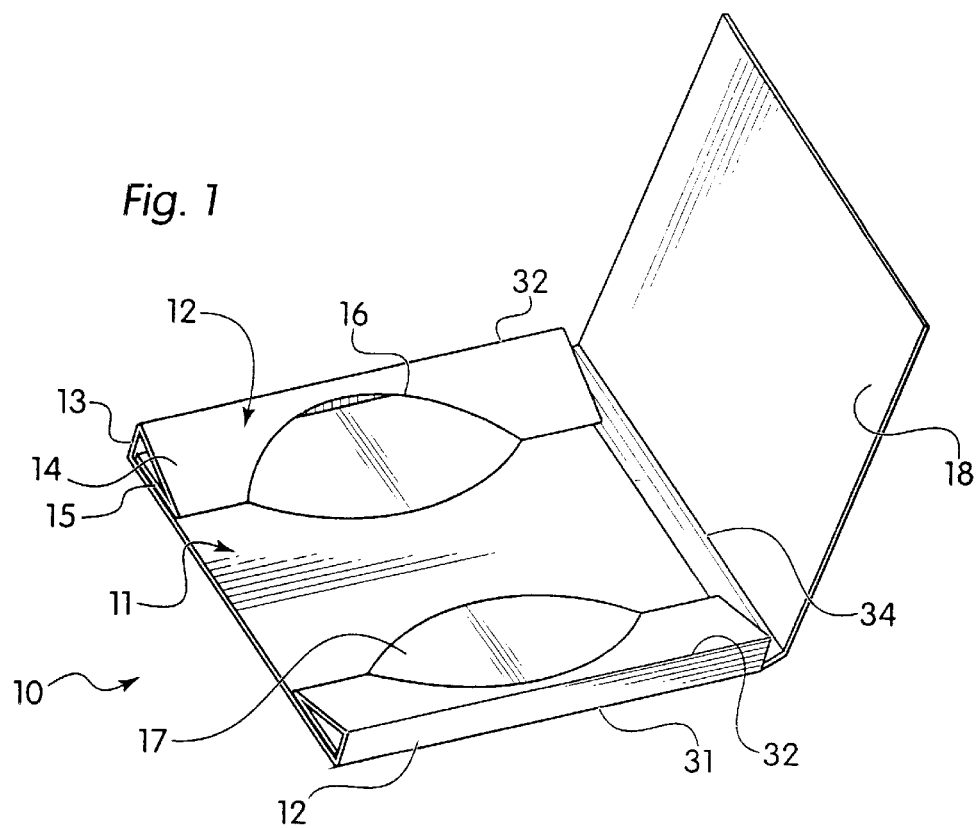
FIG. 1 is a perspective view of the disc storage case according to the invention.
Figure 2:
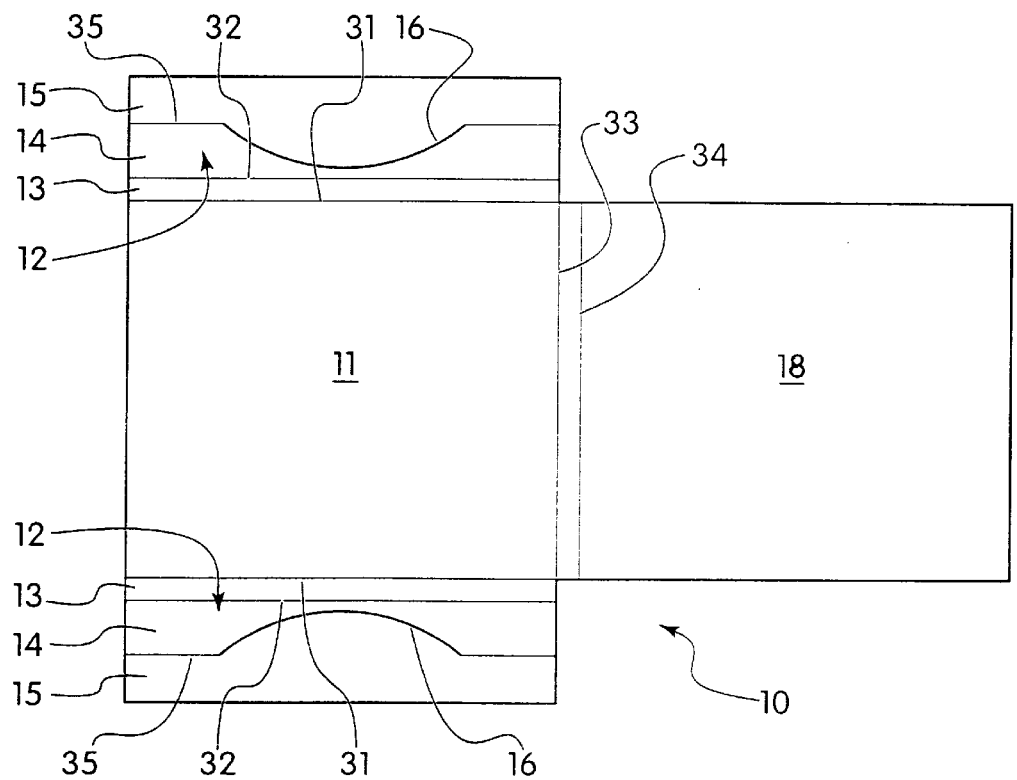
FIG. 2 is a plan view of the disc storage case according to the invention in the unfolded state.

Turning now in detail to the drawings, and in particular, FIG. 1, there is shown the disc storage case 10 according to the invention, which comprises a center panel 11, two side panels 12 and 12' and a cover panel 18. Disc storage case 10 is made from a single folded sheet of material, which is shown in the unfolded state in FIG. 2. Disc storage case 10 is preferably made from paperboard, as it is lightweight, easily printable and environmentally safe. Disc storage case 10 can be preprinted on all sides with artistic or promotional material, and is also well adapted to receive illustrative material glued on after assembly.

The different sections of disc storage case 10 are separated by hinges 31, 32, 33, 34, and 35 that are scored into the material. This type of cut and scored sheet can be easily manufactured by an automatic die cutting machine. Storage case 10 can be easily assembled merely by folding the panels along hinges 31, 32 and 35, and is kept in the assembled position by the insertion of a disc. No glue or adhesive is necessary.

To assemble disc storage case 10, disc support panels 12 and 12' are folded along their hinges 31, 32 and 35 into the shape shown in FIG. 1. Disc support panels 12 and 12' form side wall 13, top sloped wall 14 and bottom flap 15. To assemble disc storage case 10, side walls 13 are folded up along hinge 31 perpendicular to center panel 11, top sloped walls 14 are folded down along hinge 32 toward the center of center panel 11, and bottom flap 15 is folded under top wall 14 along hinge 35 to extend back toward side wall 13. To protect a disc being stored in disc storage case 10, cover panel 18 is folded over case 10 and shields disc 10 from any exposure.

Figure 3:
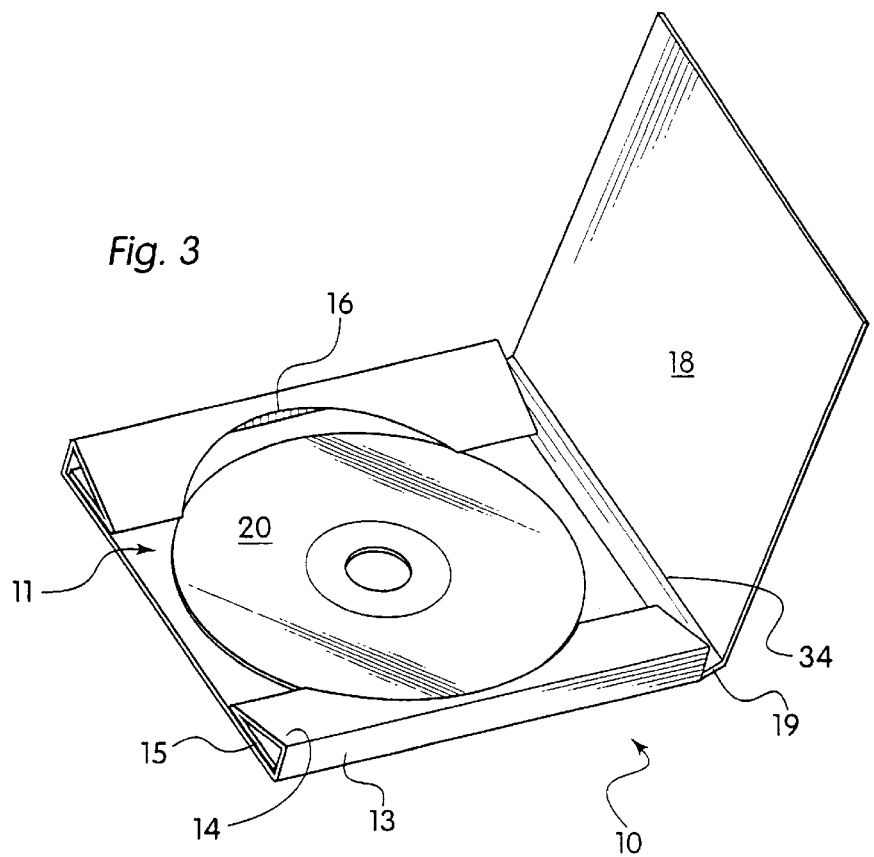
FIG. 3 is a perspective view of the disc storage case according to the invention showing a disc mounted therein.

Top wall 14 has an arcuate slit 16 cut therethrough, whose end points terminate at the hinge between top wall 14 and bottom flap 15. Slit 16 has a curvature identical to the curvature of the disc for which the case is designed, so that when a disc 20 is inserted into disc storage case 10, it is securely held inside storage case 10 with no risk of falling out. Upon folding bottom flap 15 under top wall 14, the portion of top wall 14 that is underneath arcuate slit 16 follows the fold of hinge 35 and lies parallel bottom fold 15 to create a flap 17. This way, arcuate slit 16 creates a space into which a disc 20 is inserted, as shown in FIG. 3.

Figure 4:
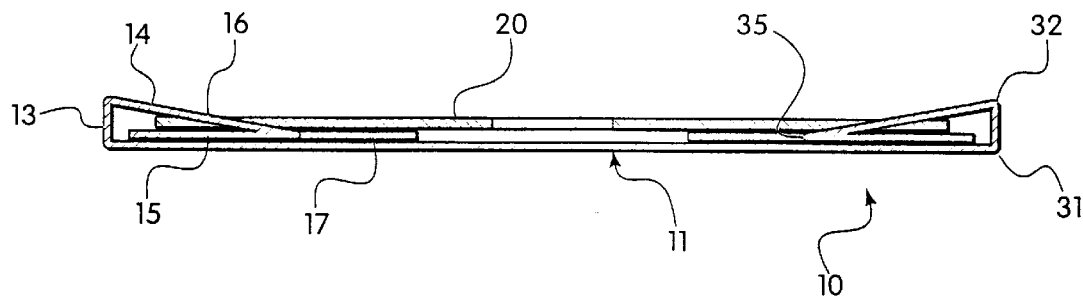
FIG. 4 is an end view of the disc storage case according to the invention with a disc mounted therein.
Figure 5:
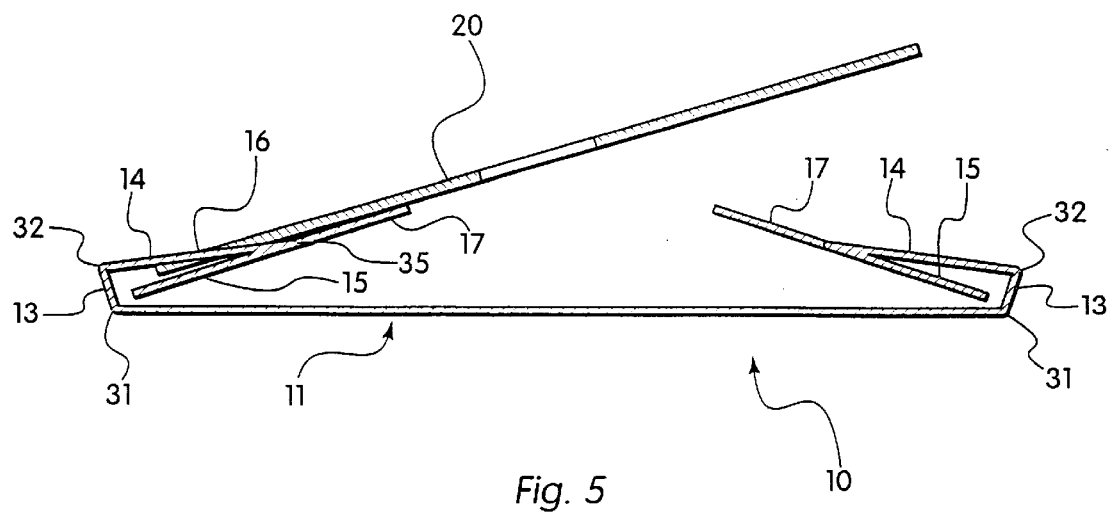
FIG. 5 is an end view of the disc storage case according to claim 4, showing removal of the disc.

As shown in FIG. 4, disc 20 rests within slits 16 of storage case 10 and contacts storage case 10 only around its outer edges. This way, disc 20 can be securely stored without the risk of scratching or damage from the case.

To insert or remove disc 20 from case 10, side walls 13 are bent away from the center of case 10 along hinge 31, which increases the size of the disc opening created by slits 16, and causes disc 20 to be released from one or both of slits 16. Furthermore, to further ease removal of disc 20 from the case, flap 17 is raised upward as side wall 13 is pulled outward, and presses disc 20 up and out of case 10.

The ease of insertion and removal of disc 20 is important because when large quantities of discs are being sold and distributed, they must be able to be inserted in their cases by automated methods. The construction of case 10 according to the invention allows for simple, automated insertion of discs into case 10.

Figure 6:
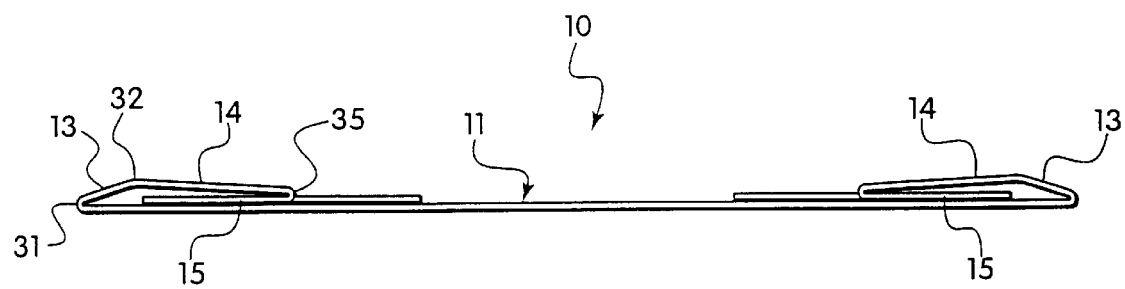

In the mass production and distribution of disc storage cases, it is important to be able to ship large quantities of cases in an efficient and economical manner. It is also important to be able to ship the cases fully assembled, so that the receiver of large quantities of disc holders does not have to complete assembly. To facilitate shipping of disc storage case 10, case 10 can be flattened out after assembly by pressing side walls 13 and top walls 14 flat down onto center panel 11, as shown in FIG. 6. Many disc storage cases 10 can then be stacked on top of each other and kept flat for shipping. After arrival at its destination, case 10 easily springs back with slight assistance into its assembled, three-dimensional shape, without requiring further assembly.

Figure 7:
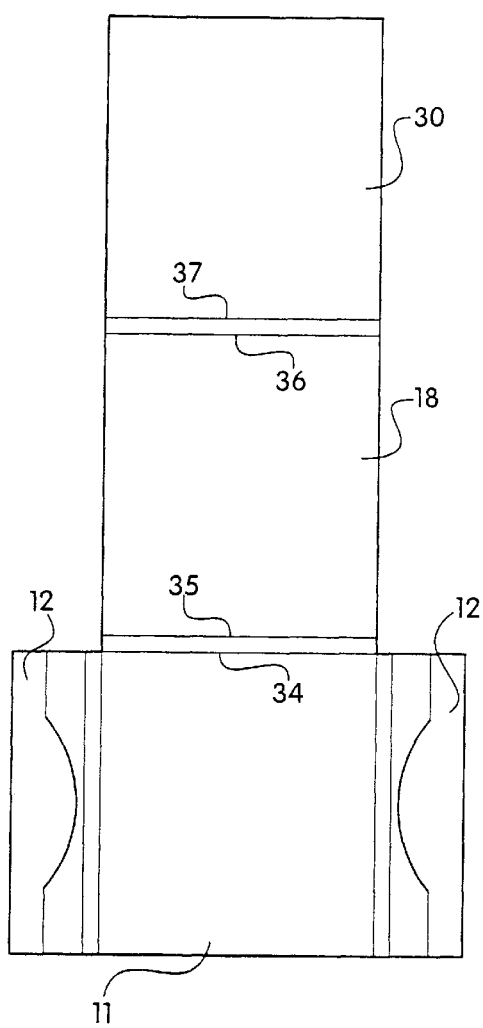
FIG. 7 is a plan view of an alternative embodiment of the disc storage case according to the invention, showing two cover panels.

Case 10 can be created in many different forms, all made from a single folded and scored piece of material. For example, case 10 could be formed with a second cover panel 30 connected to cover panel 18 via hinges 36 and 37 for folding around case 10, so that all sides of case 10 are surrounded by cover panels, as shown in FIG. 7.

Figure 8:
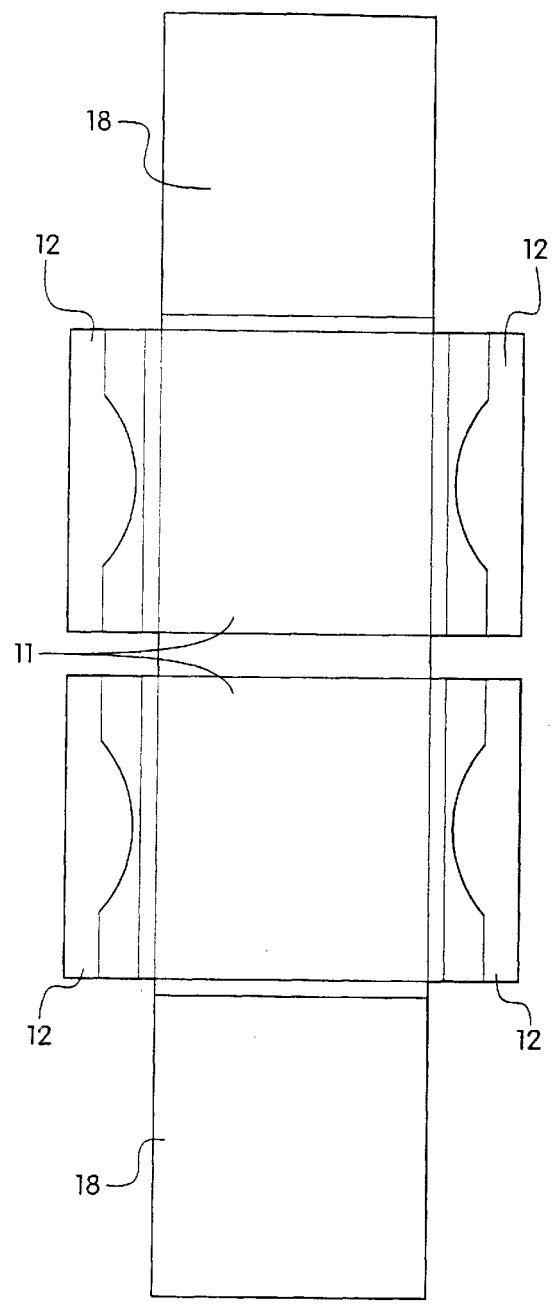
FIG. 8 is a plan view of another alternative embodiment of the disc storage case according to the invention, showing two disc holding panels and two cover panels.

Another variation of case 10 could include a multi-disc case as shown in FIG. 8, where two center panels 11 are connected to two cover panels 18. Cover panels 18 could be folded over center panels 11 and the two center panels 11 can be folded together to form a convenient, compact multi-disc storage case. Many other variations of case 10 could also be envisioned, which comprise combinations of center panels for holding discs and cover panels. In any of the variations, the disc storage case can be folded flat for economical shipping, and is stamped and cut from a single sheet of material.

Accordingly, while only several embodiments of the present invention have been shown and described, it is obvious that many changes and modifications may be made thereunto without departing from the spirit and scope of the invention.

What is claimed is:

1. A disc storage case for storing a disc of a predetermined diameter formed from a single folded sheet, comprising:

a center panel having an inside surface and an outside surface;

two disc support sections, each being integrally formed with an opposite edge of said center panel, each disc support section forming a side wall, a top sloped wall and a bottom flap, wherein said side wall is connected to said center panel by a first scored hinge and to said top sloped wall by a second scored hinge, and said top sloped wall is connected to said bottom flap by a third scored hinge, each of said top sloped walls having an arcuately-shaped slit cut therethrough, said slit having two ends, each end terminating at the third scored hinge, such that the slit creates an arcuate opening for insertion of a disc;

wherein the spacing between the arcuate openings is slightly less than the diameter of the disc; and wherein the case is assembled by folding each side wall up from the center panel and each of said top slanted walls toward the center of the inside surface of said center panel, and folding each of said bottom flaps under said top slanted walls to rest against the inside surface of said center panel.

2. The disc storage case according to claim 1, further comprising at least one cover panel hingedly connected to said center panel, wherein said at least one cover panel is adapted to be folded over the inside surface of said center panel to protect the disc.

3. The disc storage case according to claim 2, wherein there are two cover panels, one cover panel being hingedly connected to said center panel, and the other cover panel being hingedly connected to said one cover panel, wherein said other cover panel is adapted to be folded over the outside surface of said center panel.

4. The disc storage case according to claim 1, wherein the case is made from paperboard.

5. The disc storage case according to claim 1, further comprising a second center panel attached to two disc support sections, such that two discs can be stored in the same case.

6. The disc storage case according to claim 1, wherein the sheet is preprinted on available surfaces.

* * * * *